(12) United States Patent
Liu et al.

(10) Patent No.: US 11,884,751 B2
(45) Date of Patent: Jan. 30, 2024

(54) ENVIRONMENTALLY FRIENDLY CELLULOSE WASTE RECYCLING

(71) Applicant: Washington State University, Pullman, WA (US)

(72) Inventors: Hang Liu, Pullman, WA (US); Jinwen Zhang, Pullman, WA (US); Wangcheng Liu, Pullman, WA (US)

(73) Assignee: Washington State University, Pullman, WA (US)

( * ) Notice: Subject to any disclaimer, the term of this patent is extended or adjusted under 35 U.S.C. 154(b) by 0 days.

(21) Appl. No.: 16/612,510

(22) PCT Filed: May 11, 2018

(86) PCT No.: PCT/US2018/032239
§ 371 (c)(1),
(2) Date: Nov. 11, 2019

(87) PCT Pub. No.: WO2018/213117
PCT Pub. Date: Nov. 22, 2018

(65) Prior Publication Data
US 2020/0199257 A1   Jun. 25, 2020

Related U.S. Application Data

(60) Provisional application No. 62/635,892, filed on Feb. 27, 2018, provisional application No. 62/505,967, filed on May 14, 2017.

(51) Int. Cl.
*C08B 16/00* (2006.01)
*C08B 15/02* (2006.01)

(52) U.S. Cl.
CPC .............. *C08B 16/00* (2013.01); *C08B 15/02* (2013.01)

(58) Field of Classification Search
CPC .................................. C08B 16/00; C08B 15/02
See application file for complete search history.

(56) References Cited

U.S. PATENT DOCUMENTS

| 4,266,981 A | 5/1981 | Tsao et al. |
| 4,526,620 A | 7/1985 | Selin et al. |

(Continued)

FOREIGN PATENT DOCUMENTS

| CN | 1702201 A | 11/2005 |
| CN | 101397369 A | 4/2009 |

(Continued)

OTHER PUBLICATIONS

English Machine Translation for CN1702201 A obtained at https://worldwide.espacenet.com/publicationDetails/claims?CC=CN&NR=1702201A&KC=A&FT=D&ND=3&date=20051130&DB=EPODOC&locale=en_EP# (Year: 2005).*

(Continued)

*Primary Examiner* — Arrie L Reuther
(74) *Attorney, Agent, or Firm* — Liang IP, PLLC

(57) ABSTRACT

Techniques for chemically recycling cellulose waste such as cotton are disclosed herein. In one embodiment, a method includes hydrolyzing a cotton waste and dissolving cellulose in the hydrolyzed cotton waste in an aqueous solution containing an alkali and one or more of urea ((NH2)2CO), polyethylene glycol, or thiourea (SC(NH2)2) to produce another aqueous solution containing dissolved cellulose. Then the another aqueous solution containing the dissolved cellulose can be extruded into a coagulation bath to coalesce the dissolved cellulose in the extruded solution, thereby reforming the dissolved cellulose from the cotton waste into a regenerated fiber.

9 Claims, 5 Drawing Sheets

(56) References Cited

U.S. PATENT DOCUMENTS

| | | | |
|---|---|---|---|
| 5,609,676 A | | 3/1997 | von der Eltz |
| 2002/0036070 A1 | | 3/2002 | Luo et al. |
| 2012/0040411 A1 | | 2/2012 | Henriksson et al. |
| 2014/0343270 A1 | * | 11/2014 | Lindstrom ............... D01F 2/00 536/57 |

FOREIGN PATENT DOCUMENTS

| | | | |
|---|---|---|---|
| CN | 102443868 A | * | 5/2012 |
| CN | 102443868 A | | 5/2012 |
| WO | WO2013102911 | | 7/2013 |
| WO | WO2016123643 | | 8/2016 |

OTHER PUBLICATIONS

English Machine Translation CN102443868 (A) obtained https://worldwide.espacenet.com/publicationDetails/biblio?CC=CN&NR=102443868A&KC=A&FT=D&ND=3&date= 20120509&DB=EPODOC&locale=en_EP# (Year: 2012).*

Definition of "regenerate" obtained Oct. 26, 2022 at https://www.merriam-webster.com/dictionary/regenerate (Year: 2022).*

Partial translation of CN102443868A for S/N U.S. Appl. No. 16/612,510 (SWT 691821), United States Patent and Trademark Office Translations Service Center, Irina Knizhnik, Feb. 16, 2023.*

International Search Report and Written Opinion dated Jul. 31, 2018, in International Application No. PCT/US18/32239, 8 pages.

Extended European search report issued in European Application No. 118802713.0-1102 dated Oct. 12, 2020 (5 pages).

Jie Cai, et al.: from Cellulose Solution. "Novel Fibers Prepared in NaOH/Urea Aqueous Solution", Macromolecular Rapid Communications. Wiley-VCH. DE. vol. 25. No. 17. Sep. 9, 2004 (Sep. 9, 2004). pp. 1558-1562.

Office Action issued in Chinese Patent Application No. 201880032051.09, dated Mar. 25, 20212 (19 pages).

Green Chemistry, (3 pages); Green Chemistry, p. 162, Yulong Shen, et al, China Environmental Press, Apr. 30, 2016, 7th edition.

Examination Report in Indian Application No. 201917045375 dated Jun. 21, 2021 (5 pages).

Notice of Intent to Grant issued in European Application No. 118802713.0-1102 dated Aug. 5, 2021 (7 pages).

* cited by examiner

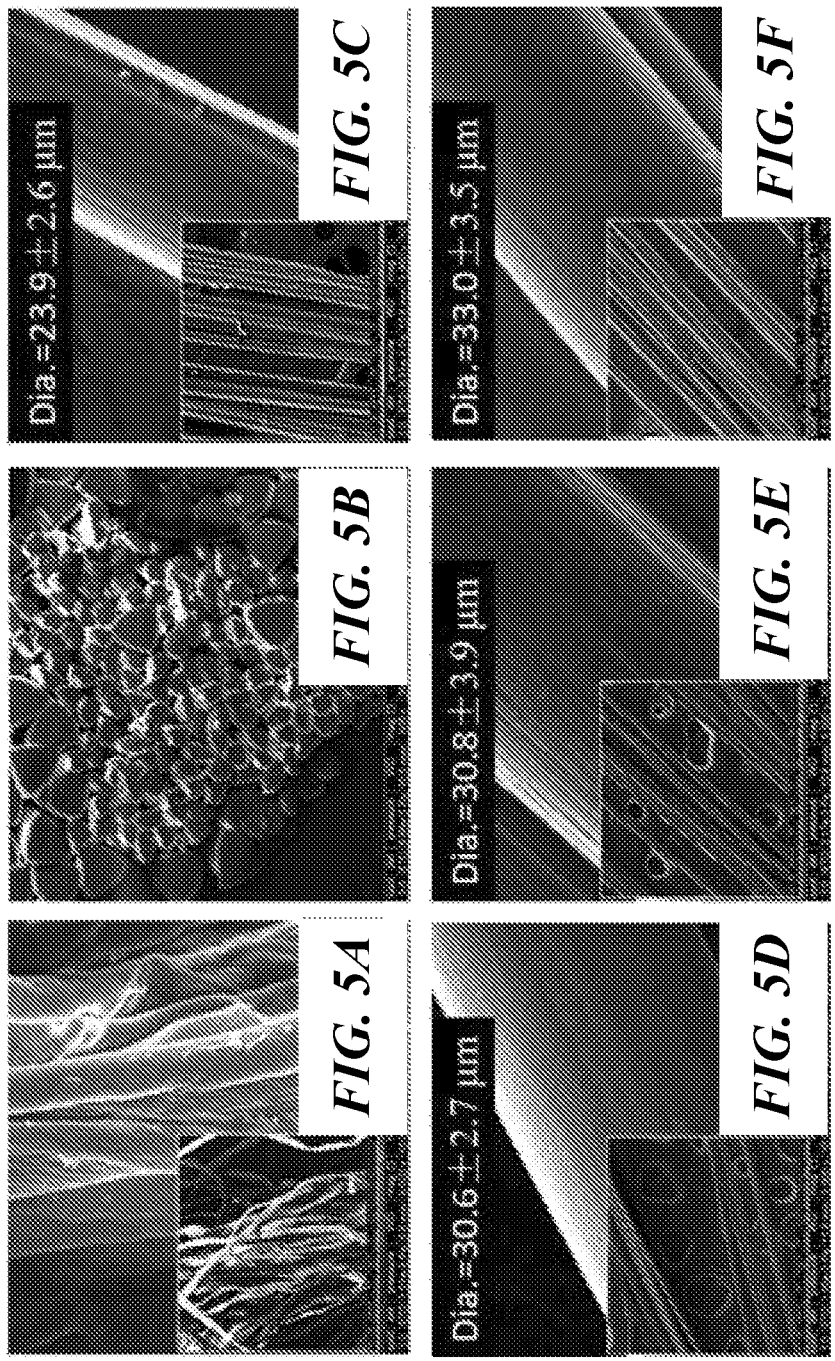

ENVIRONMENTALLY FRIENDLY CELLULOSE WASTE RECYCLING

CROSS-REFERENCE TO RELATED APPLICATION(S)

This application is a non-provisional of and claims priority to U.S. Provisional Application Nos. 62/505,967, filed on May 14, 2017, and 62/635,892, filed on Feb. 27, 2018, the disclosures of which are incorporated herein in their entirety.

STATEMENT REGARDING FEDERALLY SPONSORED RESEARCH

This work was made with government support under grant no. SU83678701 awarded by the Environmental Protection Agency. The government has certain rights in the invention.

BACKGROUND

Cotton is a material widely used in consumer products such as garments and textiles. Consumption of such cotton products has been growing steadily in the past several decades. With such increased consumption, cotton waste generation also rises. Cotton waste can be categorized into pre-consumer or post-consumer waste. Pre-consumer waste is generated during production of yarns, fabrics, and end products while post-consumer waste is generated when cotton products are discarded after use.

Pre-consumer waste typically can be reclaimed for lower grade yarns and nonwoven products for automotive, building insulation, furnishings, etc. However, post-consumer waste can be difficult to recycle using existing reclaiming techniques due to impurities left on the cotton products and/or tear/wear during use. An estimated 95% of post-consumer waste ends up in landfills or is incinerated. Landfilling or incinerating post-consumer waste can produce a large amount of greenhouse gases and/or toxic chemicals/odors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Recycling post-consumer waste of cellulose products such as cotton products can be challenging due to wide variances in quality and tear/wear of the waste. Due to strong intra-molecular and/or inter-molecular hydrogen bonding of cellulose in cotton, cotton fiber can be difficult to dissolve in common solvents. Instead, environmentally unfriendly solvents are typically used. For example, rayon fiber manufacturing can utilize carbon disulfide ($CS_2$) in the viscose process or a cuprammonium hydroxide complex solution and heavy metals in the cuprammonium process. The foregoing chemicals are toxic to humans and animals and are difficult to be recycled and reused.

Several embodiments of the disclosed technology are directed to techniques of recycling post-consumer waste of cellulose products (e.g., cotton products) to produce regenerated fibers using environmentally friendly solvents. In one implementation, shredded post-consumer waste can be first hydrolyzed using an acid (e.g., sulfuric acid) to reduce a degree of polymerization of cellulose fibers in the cellulose products, for example, from about 1,800 to a range of about 240 to about 860. The hydrolyzed fibers can then be readily dissolved in an alkaline/urea solvent and be suitable for wet spinning or other suitable techniques to form individual regenerated fibers or films.

In accordance with aspects of the disclosed technology, example alkaline/urea solvents can include aqueous solutions containing sodium hydroxide (NaOH) and urea (($NH_2$)$_2$CO), or lithium hydroxide NOM and (($NH_2$)$_2$CO). In other examples, sodium hydroxide or lithium hydroxide in the foregoing example solvents can be replaced with potassium hydroxide (KOH) or other suitable types of strong base. In further examples, urea in the foregoing example solvents can also be replaced, at least in part, with polyethylene glycol (PEG) and/or thiourea (SC($NH_2$)$_2$).

Certain experiments using the foregoing example solvents have been conducted to test effectiveness for recycling post-consumer waste of cotton products. During the experiments, diameter, morphology, thermal properties, crystallinity, and tensile properties of regenerated fibers were characterized using scanning electron microscope (SEM), thermal gravim analysis (TGA), x-ray diffraction (XRD), and tensile tests. Results from the experiments showed that using embodiments of the recycling techniques discussed herein, regenerated fibers can be produced from post-consumer waste of cotton products. The regenerated fibers can have properties or qualities comparable to regenerated fibers commercially produced from wood pulp. As such, the experiments showed that post-consumer waste of cotton products can be properly recycled to produce high quality regenerated fibers using environmentally friendly solvents, instead of using toxic solvents such as Schweizer's reagent, cadmiumethylenediamine (Cadoxen), and lithium chloride/dimethylacetamide.

By recycling post-consumer waste of cellulose products such as cotton products instead of landfilling or incinerating such waste, both landfill spaces and an amount of greenhouse gases and toxic chemicals/odors from cellulose anaerobic decomposition in landfills and incinerating can be significantly reduced. Recycling post-consumer waste can also reduce demand on growing virgin cotton or other types of cellulose raw materials. Virgin cotton cultivation involves heavy use of chemicals, such as pesticides, fungicides, and defoliants. It is estimated that 25% of the world's pesticides are used for cotton plantation on 2.4% of the world's farmlands. In addition, cotton fiber scouring and bleaching processes also rely heavily on chemicals, water, and energy. Thus, by producing high quality regenerated fiber from cellulose waste, cultivation of virgin cotton or other types of cellulose raw materials can be reduced along with the negative environmental impact of such cultivation.

In addition, another aspect of the disclosed technology can involve recycling post-consumer waste of cellulose products without removing dye from the cellulose products during the recycling process. As a result, regenerated fibers manufactured from colored cellulose products can have intrinsic colors and thus may require no further dyeing before end use. The reduction or even elimination of dye removal from recycled cellulose products can reduce cost of the regenerated fibers and pollution associated with dye removal and/or additional dyeing processes.

BRIEF DESCRIPTION OF THE DRAWINGS

FIGS. 5A-5F are example SEM images showing morphology of (a) an original cotton fiber, (b) cross section of a fiber, (c) regenerated fiber with 0.05% sulfuric acid ($H_2SO_4$)-3.25% cotton in lithium hydroxide (LiOH), (d) regenerated fiber with 0.2% $H_2SO_4$-3.25% cotton in LiOH, (e) regenerated fiber with 0.2% $H_2SO_4$-5% cotton in LiOH, and (f) regenerated fiber with 0.2% $H_2SO_4$-5% cotton in sodium hydroxide (NaOH), respectively, in accordance with embodiments of the disclosed technology.

DETAILED DESCRIPTION

Figure 1:
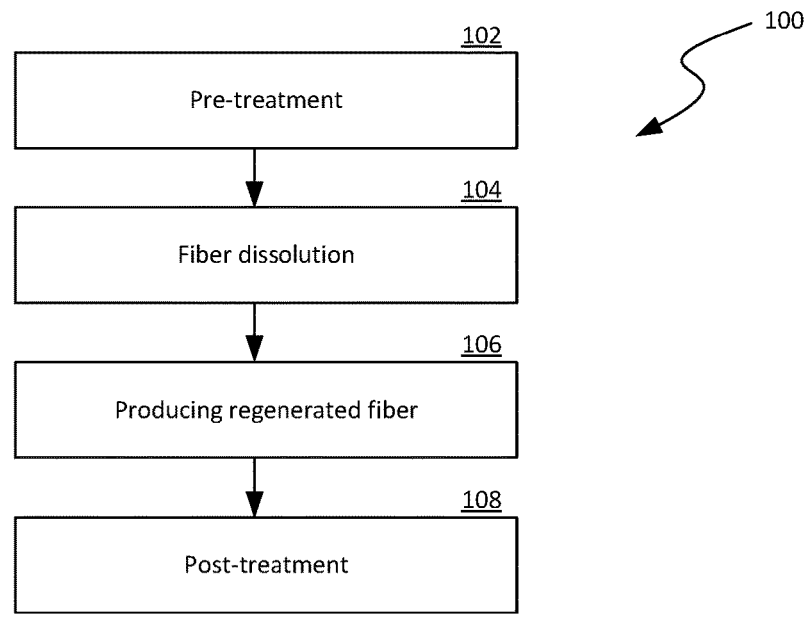
FIG. 1 is a flowchart illustrating a recycling process of cellulose waste in accordance with embodiments of the disclosed technology.

Certain embodiments of systems, devices, articles of manufacture, and processes for recycling cellulose products are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, "cellulose waste" generally refers to unwanted or unusable materials that contain at least partially cellulose. One example cellulose waste can be "cotton waste" that includes unwanted or unusable materials containing, at least in part, cotton. For example, cotton waste can include textiles, garments, or other types of consumer products containing cotton that are discarded after primary use, worthless, defective, or of no use. In other examples, cotton waste can also include white cotton, cotton with colors, and cotton blends (e.g., cotton/polyester and cotton/nylon blends). Cellulose waste (e.g., cotton waste) can be generally categorized into pre-consumer or post-consumer waste of cellulose products. Pre-consumer waste can be generated during, for example, production of yarn, fabrics, and end products (e.g., garments) while post-consumer waste can be generated when cellulose containing products are discarded after use. Even though several embodiments of the technology discussed below as being applied for recycling post-consumer waste of cotton products, in other embodiments, the disclosed technology may also be applied for recycling pre-consumer waste of cellulose products or may be applied to produce regenerated fibers from other pre-consumer or post-consumer waste (e.g., of wood, bamboo, etc.) in suitable applications.

Also used herein, the term "regenerated fibers" or "regenerated cellulose fibers" generally refers to cellulose fibers produced by dissolving cellulose of a plant (e.g., from wood, bamboo, cotton, etc.) in chemicals and reform the dissolved cellulose into fibers again. One example of a regenerated fiber is Rayon which is produced by dissolving cellulose of wood pulp in chemicals and reforming the dissolved cellulose into fibers via, for example, the viscose method. In another example, as discussed in more detail herein, several embodiments of the disclosed technology can be utilized to produce regenerated fibers by dissolving post-consumer waste of cellulose products such as cotton products with environmentally friendly solvents. In contrast, the term "virgin cotton fiber" generally refers to cotton fiber derived directly from cotton plants. Virgin cotton fibers can be spun into yarns, which can then be woven or knitted into fabrics.

As a natural material with appealing comfort and easy care properties, cotton has been utilized in consumer products (e.g. clothing and textiles like towels and bedding) more than other fiber materials. Cotton consumption has been steadily increasing with the fast fashion trend/throw-away lifestyle and declining price of apparel and textiles as a result of global sourcing. Approximately two-thirds by weight of textile waste in the United States are cotton products, amounting to 3.7% of municipal solid waste generated.

However, cotton can be difficult to dissolve and thus difficult to recycle. Current recycling rate of cotton waste is estimated at about 5%, and largely lower than overall textile recycling rate of about 15%. As such, cotton waste is either buried in landfills or burned in incinerators, both of which can generate substantial amounts of greenhouse gases (e.g., methane and carbon dioxide) and toxic chemicals/odors. Such treatment of cotton waste can harm the environment and human health, and is also in contradiction with efficient use of natural cellulose resources.

Several embodiments of the disclosed technology are directed to recycling of post-consumer waste of cellulose products such as cotton products by dissolving cellulose fibers (e.g., from cotton) with environmentally friendly solvents and spinning the dissolved fibers into high quality regenerated fibers for a broad range of end uses. By using cellulose waste as a raw material and environmentally friendly solvents for fiber dissolving and spinning, embodiments of the disclosed technology can reduce cellulose waste for landfills or incinerators, and thus reducing greenhouse and toxic chemical/odor emissions. Embodiments of the disclosed technology and additional advantages are described in more detail below with reference to FIGS. 1-8.

FIG. 1 is a flowchart illustrating a recycling process 100 of cellulose waste in accordance with embodiments of the disclosed technology. As shown in FIG. 1, the process 100 can include performing pre-treatment of a cellulose waste at stage 102. The cellulose waste can be pre-consumer or post-consumer waste. In one embodiment, the pre-treatment of cellulose waste can include various mechanical treatment techniques. For example, the cellulose waste can be sorted (e.g., based on size, color, etc.), shredded (e.g., into strips, strands, etc.), washed (e.g., with water or steam), and/or dried (e.g., with hot air).

In other embodiments, the pre-treatment of the cellulose waste can also include various chemical treatment techniques. In one example, shredded cotton waste can be hydrolyzed using an acid solution such as an aqueous solution of sulfuric acid ($H_2SO_4$) under a hydrolysis temperature for a hydrolysis reaction period. One or more of the hydrolysis temperature, hydrolysis reaction period, or a concentration of the acid can be adjusted to reduce polymerization of the cotton waste from about 1,800 to a range of about 240 to about 760, a range of about 550 to about 860, or other suitable ranges. Example values for the foregoing variables can be 120° C., 12 minutes, and about 0.2% sulfuric acid, respectively. In further embodiments, the cotton waste can also be pre-treated using enzymes (e.g., cellulase) to enhance dissolution.

The process 100 can then include performing fiber dissolution of the pre-treated cellulose waste to produce a fiber solution containing cellulose at stage 104. The produced fiber solution can have a cellulose concentration of about 2% to about 10%, about 3% to about 7%, or other suitable ranges. Unlike other recycling techniques, embodiments of the disclosed technology can utilize an environmentally friendly solvent 114 (shown in FIG. 2) for dissolving cellulose in the cellulose waste. The solvent 114 used can also be low cost and can be reused. In one example, the solvent 114 can include an aqueous solution of sodium hydroxide (NaOH) and urea (($NH_2$)$_2$CO), or lithium hydroxide (LiOH) and (($NH_2$)$_2$CO). In other examples, sodium hydroxide or lithium hydroxide in the foregoing example solvents 114 can be replaced with potassium hydroxide (KOH) or other suitable types of strong base. In further examples, urea in the foregoing example solvents 114 can also be replaced, at least in part, with polyethylene glycol (PEG) and/or thiourea ($SC(NH_2)_2$).

During fiber dissolution, one or more operational parameters can be adjusted to achieve sufficient reaction or cellulose dissolution such that the dissolved fibers in the produced fiber solution can be reformed into regenerated fibers. Example operational parameters can include application of mechanical agitation and associated degree of mechanical agitation, a solvent temperature (e.g., about −15° C. to about 0° C. or about −5° C. to about 0° C.), a dissolution reaction time, as well as a concentration and/or composition of the solvent 114. Without being bound by theory, it is believed that insufficient dissolution can result in an excessively viscous fiber solution, while excessive dissolution can result in the fiber solution being excessively watery. Under both conditions, the dissolved fibers in the fiber solution may not be readily reformed into regenerated fibers. Example values of the foregoing operational parameters during fiber dissolution are described in more detail below with reference to the experiment section.

Various processing apparatus can be used for dissolving the cotton waste in a continuous or batch mode. For example, as described in more detail below with reference to FIG. 2, a constantly stirred tank reactor (CSTR) 110 (shown in FIG. 2) can be used for dissolving shredded cotton waste in a continuous mode. In other examples, a plug flow reactor (not shown) can also be used process the cotton waste in a continuous mode. In further examples, a tank reactor (not shown) can also be used to process the cotton waste in a batch mode.

The process 100 can then include producing regenerated fiber from the dissolved fiber in the fiber solution at stage 106. In one embodiment, the regenerated fiber can be produced by wet spinning the dissolved fiber in a coagulation bath 134 (shown in FIG. 3) containing a coagulant. Example coagulant can include sulfuric acid ($H_2SO_4$), ethanol ($C_2H_5OH$), butanol ($C_4H_9OH$), and acetone (($CH_3$)$_2$CO). During wet spinning, in certain embodiments, a spinneret can be used to extrude the dissolved fibers into the coagulation bath. Upon reacting with the coagulant in the coagulation bath, cellulose in the fiber solution can coagulate and form the regenerated fiber. The regenerated fiber can then be spun using one or more godet rollers into yarns. An example wet spinning apparatus suitable for producing the regenerated fiber is described in more detail below with reference to FIG. 3. In other embodiments, the regenerated fiber can also be produced by dry spinning using hot air, gel spinning, or other suitable fiber forming techniques.

The process 110 can then include performing post-treatment of the regenerated fiber at stage 108. In one embodiment, post-treatment of the regenerated fiber can include drawing, washing with water, and subsequently drying at room temperature or other suitable temperatures. In other embodiments, post-treatment of the regenerated fiber can also include modifications of the regenerate fiber for enhancing antimicrobial activity, reducing shrinkage, improving wrinkle resistance, decreasing skin irritation, increasing dye exhaustion, or enhancing fragrance. Such modifications can include applying monomers, polymers, and biopolymers to the regenerated fiber surface or adding functional agents to a polymer solution. An example biopolymer is Chitosan.

As described in more detail later herein, certain experiments using the foregoing example solvents and following similar operational stages have been tested for recycling post-consumer waste of cotton products as samples. Results of these experiments showed that using embodiments of the recycling techniques discussed herein, high quality regenerated fibers can be produced from post-consumer waste of cotton products. The regenerated fibers can have properties that are comparable to regenerated fiber commercially produced from wood pulp. As such, post-consumer waste of cotton products can now be recycled to produced quality regenerated fibers using environmentally friendly solvents.

By recycling post-consumer waste instead of landfilling or incinerating cotton waste, both landfill spaces and greenhouse gases and toxic chemicals/odors from cellulose anaerobic decomposition and incinerating can be significantly reduced. Recycling post-consumer waste can also reduce demand on growing virtual cotton or other cellulose raw materials. Virgin cotton cultivation involves heavy use of chemicals, such as pesticides, fungicides, and defoliants. In addition, cotton fiber scouring and bleaching processes also rely heavily on chemicals, water, and energy. Thus, by producing regenerated fiber from cotton waste, cultivation of virgin cotton can be reduced along with the negative environmental impact of such cultivation.

In addition, using cellulose waste to manufacture regenerated fiber can reduce rayon production from wood pulp and associated negative environmental impact. The processing of wood pulp for industrial use is very water and energy intensive and has become a big contributor to environmental deterioration. Current rayon production involves using carbon disulfide ($CS_2$) or cuprammonium dihydroxide complex solution. Carbon disulfide is highly toxic, volatile, and cannot be reclaimed. Cuprammonium rayon production involves the use of copper, which is difficult to recover from waste water.

Further, another aspect of the process 100 can involve recycling the cellulose waster such as cotton waste without removing dye from the cotton waste during recycling. Thus, the foregoing recycling technique can be applied to both non-colored (e.g., white) and to dyed cellulose waste without dye removal. For example, the pre-treatment and/or the dissolution operations can be adjusted such that one or more dyes in the cellulose waste can remain intact in the regenerated fiber. As such, regenerated fibers with intrinsic colors can be produced from colored cellulose waste and thus may require no further dyeing before end use. Not only can colors of the cellulose waste be maintained in the regenerated fiber, but also new colors can be created by mixing different colored cellulose waste. The reduction or even elimination of fiber dye removal can reduce fiber costs and pollution from dye removal or dyeing processes.

Figure 2:
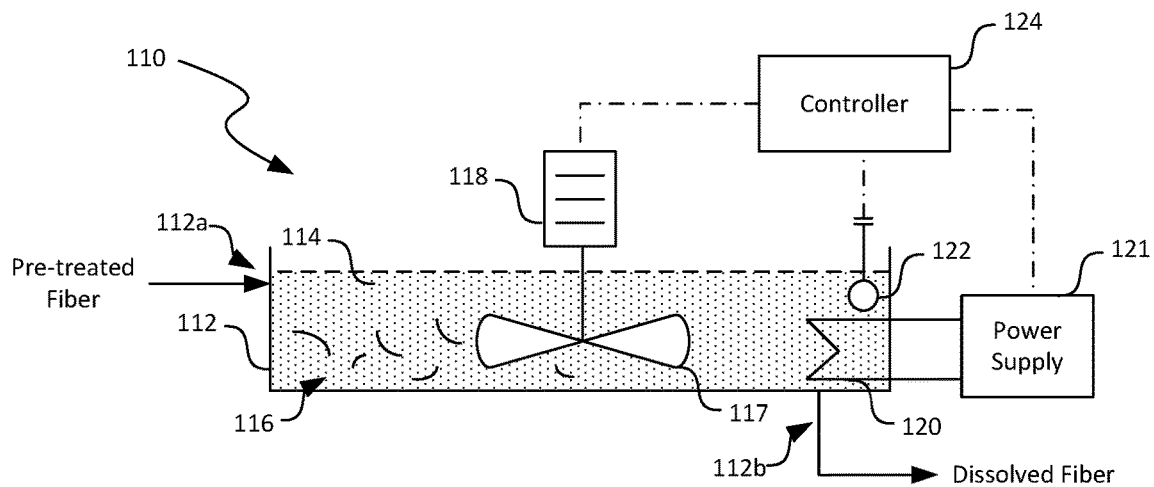
FIG. 2 is a schematic diagram of a fiber dissolving apparatus suitable for certain operations in the recycling process in FIG. 1 in accordance with embodiments of the disclosed technology.

FIG. 2 is a schematic diagram of a fiber dissolving apparatus 110 suitable for certain operations in the recycling process 100 in FIG. 1 in accordance with embodiments of the disclosed technology. As shown in FIG. 2, the fiber dissolving apparatus 110 can include a container or tank 112 having an inlet 112a configured to receive pre-treated fiber, an outlet 112b configured to supply a fiber solution of dissolved fibers to, for example, the fiber forming apparatus 130 of FIG. 3, and an internal volume and suitable construction for containing a solvent 114. Example compositions of the solvent 114 are described above with reference to FIG. 1.

Also shown in FIG. 2, the fiber dissolving apparatus 110 can also include a mechanical agitator 117 with a corresponding motor 118, a cooler 120 with a corresponding power supply 121, a temperature sensor 122, and a controller 124 operatively coupled to the foregoing components. In the illustrated example, the mechanical agitator 117 includes a mixer. In other examples, the mechanical agitator 117 an also include a static agitator (e.g., baffles), an induction type agitator, or other suitable types of agitator. The cooler 120 can include a conduction, convection, thermoelectric, or other suitable types of cooling device coupled to the power supply 121. The power supply 121 can be configured to modulate a level of energy supplied to the cooler 120. The temperature sensor 122 can include a thermocouple, a resistive temperature detector, other suitable types of temperature sensor.

The controller 124 can include a processor coupled to a memory and an input/output component (not shown). The processor can include a microprocessor, a field-programmable gate array, and/or other suitable logic devices. The memory can include volatile and/or nonvolatile computer readable media (e.g., ROM; RAM, magnetic disk storage media; optical storage media; flash memory devices, EEPROM, and/or other suitable non-transitory storage media) configured to store data received from, as well as instructions for, the processor. In one embodiment, both the data and instructions are stored in one computer readable medium. In other embodiments, the data may be stored in one medium (e.g., RAM), and the instructions may be stored in a different medium (e.g., EEPROM). The input/output component can include a display, a touch screen, a keyboard, a track ball, a gauge or dial, and/or other suitable types of input/output devices.

In certain embodiments, the controller 124 can include a computer operatively coupled to the other components of the reactive deposition system 100 via a hardwire communication link (e.g., a USB link, an Ethernet link, an RS232 link, etc.). In other embodiments, the controller 124 can include a logic processor operatively coupled to the other components of the fiber dissolving apparatus via a wireless connection (e.g., a WIFI link, a Bluetooth link, etc.). In further embodiments, the controller 124 can include an application specific integrated circuit, a system-on-chip circuit, a programmable logic controller, and/or other suitable computing frameworks.

In operation, the pre-treated fiber 116 can be fed into the tank 112 via the inlet 112a. The internal volume of the tank 112 provides a certain residence time to the pre-treated fiber 116 to react with the solvent 114. The solvent 114 can then dissolve the pre-treated fiber 116 from, for instance, a solid phase, into the solvent 114 to form a fiber solution containing dissolved fibers, i.e., a solution containing cellulose. Without being bound by theory, it is believed that the solvent 114 can separate individual cellulose strands bound together by hydrogen bonds in the solid phase, and thus rendering the cellulose strands soluble in the aqueous solution of the solvent 114, as described in more detail below with reference to FIG. 4. Subsequently, the fiber solution containing dissolved fibers is then withdrawn from the tank 112 via the outlet 112b.

During fiber dissolution, the controller 124 can be configured to adjust various control variable such that one or more process variables can be at or close to corresponding setpoints. For example, as shown in FIG. 2, the controller 124 can be configured to receive a reading from the temperature sensor 122, compare the received reading to a temperature setpoint, and adjust a power output from the power supply 121 to the cooler 120 such that the solvent 114 is maintained at or near a dissolution temperature setpoint (e.g., −12.5° C.). In another example, the controller 124 can also monitor a speed (e.g., in revolution per minute) of the mechanical agitator 117 and adjust output to the motor 118 such that the mechanical agitator 117 is rotating at or near a speed setpoint.

Figure 3:
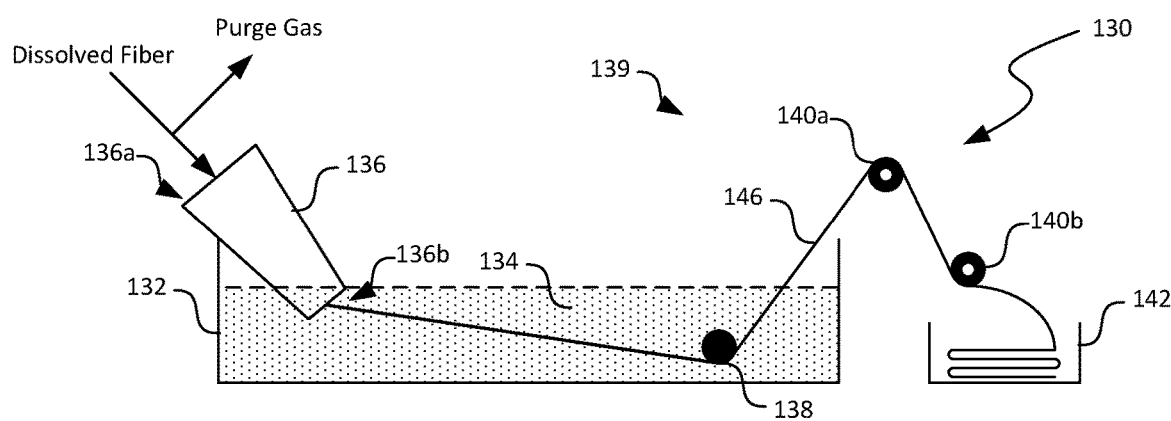
FIG. 3 is a schematic diagram of a fiber forming apparatus suitable for certain operations in the recycling process in FIG. 1 in accordance with embodiments of the disclosed technology.

FIG. 3 is a schematic diagram of a fiber forming apparatus 130 suitable for certain operations in the recycling process 100 in FIG. 1 in accordance with embodiments of the disclosed technology. As shown in FIG. 3, the fiber forming apparatus 130 can include a container 132 having a volume configured to hold a coagulant bath 134 containing a coagulant and a spinneret 136. Example coagulants are described above with reference to FIG. 1. The spinneret 136 can include an inlet 136a configured to receive the fiber solution of dissolved fibers and an outlet 136b configured to extrude the received fiber solution (sometimes referred to as "dope") into the coagulant bath 134. The spinneret 136 can include an orifice at the outlet 136b with a size suitable for extruding the dope into the coagulant bath 134 in order to form the regenerated fiber 146 with a suitable size. In one example, the orifice has a diameter of 80 μm. In other examples, the orifice at the outlet 136b can have other suitable sizes, shapes, or other properties.

In the illustrated example, the fiber forming apparatus 130 also includes a fiber collector 139 having a take up roller 138, one or more godet rollers 140 (shown as first and second godet rollers 140a and 140b), and a fiber storage 142. In other examples, the fiber collector 139 can include additional and/or different components than those shown in FIG. 3. In further examples, the fiber collector 139 may be omitted, and the regenerated fiber 146 may be collected from the coagulation bath 134 in a batch mode.

In operation, the fiber solution containing dissolved fibers is fed into the inlet 136a of the spinneret 136. A carrier and/or purge gas (e.g., nitrogen) may be used to force the solution to be extruded through the outlet 136b. The dissolved fibers in the extruded dope can then react with the coagulant in the coagulation bath 134 to be reformed into the regenerated fiber 146 by recombining multiple cellulose fibers into a single yarn. In the illustrated example, the regenerated fiber 146 can then be taken up by the take up roller 138 and spun through the godet rollers 140 into the fiber storage 142. As described in more detail below, experiments conducted have shown that the regenerated fiber 146 can have properties generally similar if not better than other regenerated fiber commercially produced from wood pulp.

Figure 4:
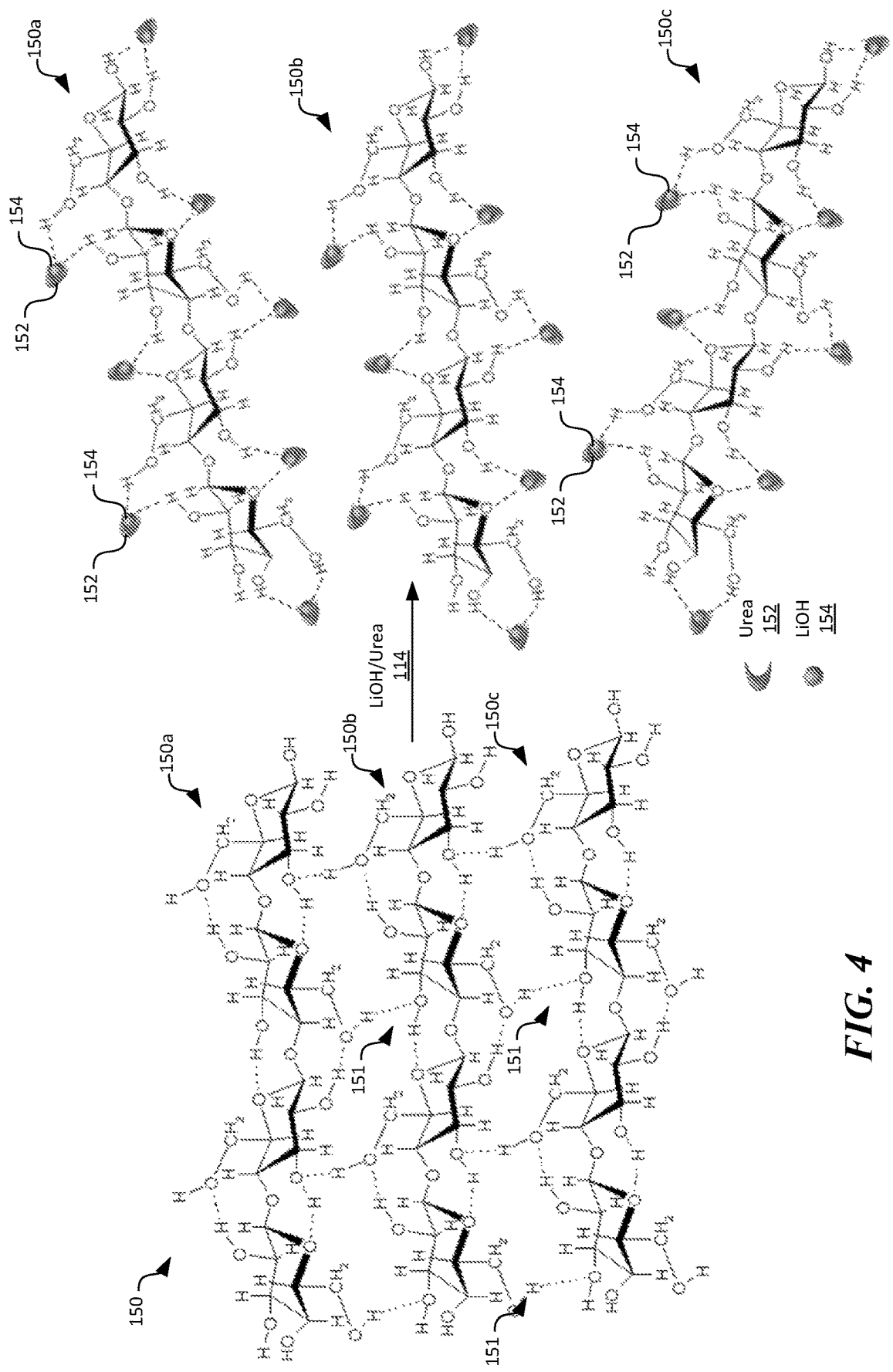
FIG. 4 is a schematic diagram illustrating one possible mechanism of fiber dissolution in accordance with embodiments of the disclosed technology.
Figure 6A:
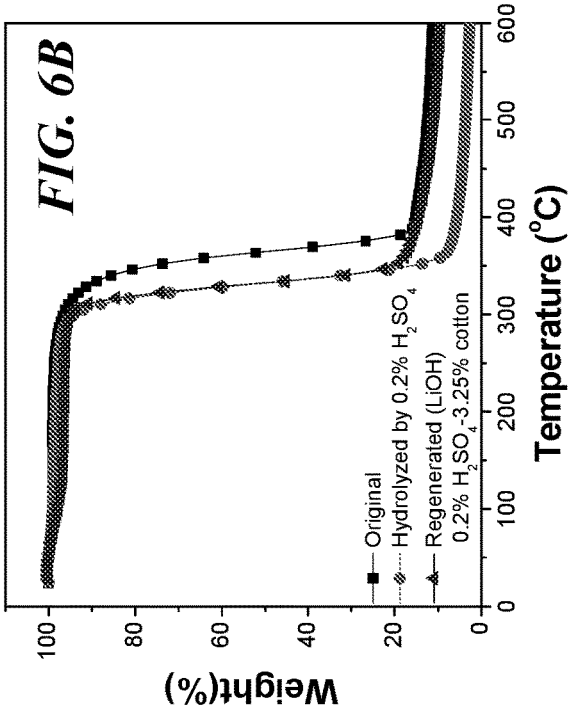
FIGS. 6A-6D are example TGA curves obtained from original, hydrolyzed, and regenerated cotton fiber for processing with (a) 0.05% $H_2SO_4$-3.25% cotton in LiOH, (b) 0.2% $H_2SO_4$-3.25% cotton in LiOH, (c) 0.2% $H_2SO_4$-5% cotton in LiOH, and (d) 0.2% $H_2SO_4$-3.25% cotton in NaOH, respectively, in accordance with embodiments of the disclosed technology.
Figure 6B:
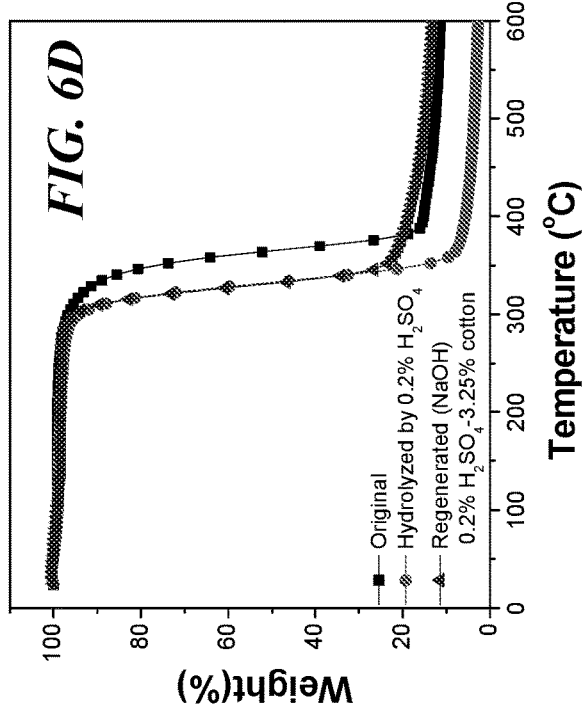
Figure 6C:
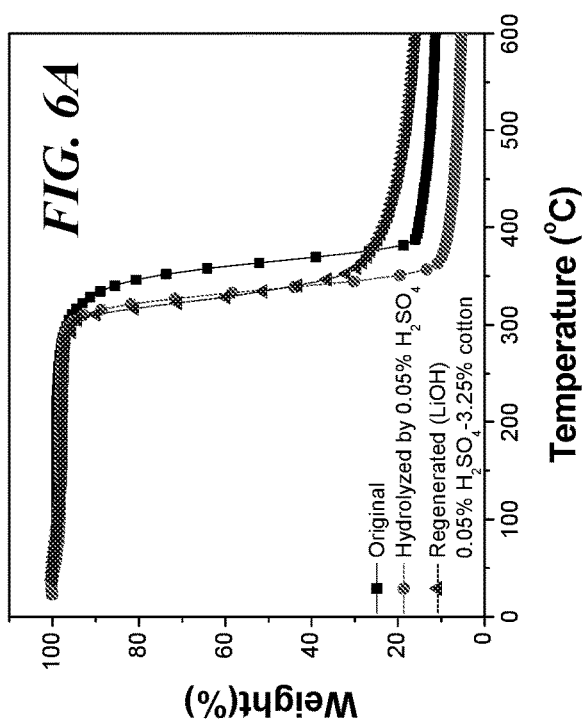
Figure 6D:
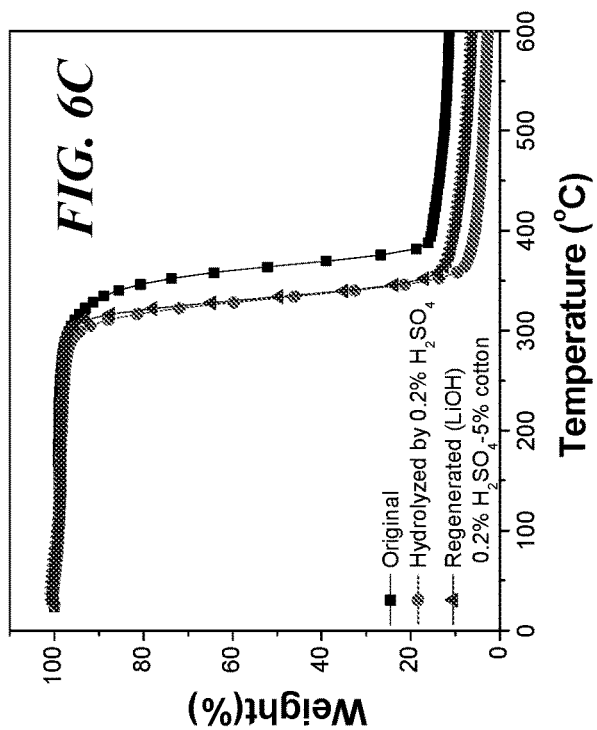

FIG. 4 is a schematic diagram illustrating one possible mechanism of dissolution of cellulose fibers in a solvent containing lithium hydroxide (LiOH) and urea in accordance with embodiments of the disclosed technology. As shown in FIG. 4, the cellulose fiber 150 can initially include multiple cellulose molecular chains or strands 150a, 150b, and 150c bound together via hydrogen bonds 151. Upon contacting with the example solvent 114, the LiOH/Urea hydrates 152/154 can penetrate and separate the cellulose molecular chains or strands 150a, 150b, and 150c in the cellulose fiber 150 by breaking the hydrogen bonds 151 therebetween. As shown in FIG. 4, instead of forming hydrogen bonds 151 with neighboring cellulose molecular chains or strands 150a, 150b, and 150c, the hydroxy groups on the cellulose molecular chains or strands 150a, 150b, and 150c form hydrogen bonds with the LiOH/urea hydrates 152/154. As such, the example solvent 114 can separate and thus dissolve the cellulose fiber 150 into an aqueous cellulose solution.

Experiments

Experiments were conducted using certain alkali/urea aqueous solvents disclosed herein to recycle post-consumer cotton fabrics and produce regenerate cellulose fibers via wet spinning. In the experiments, 100% cotton white shirt as post-consumer waste was selected as a starting material. A mild hydrolysis process was applied as a pre-treatment to lower a molecular weight of the cotton fabric. Two example solvents, an aqueous solution of LiOH/Urea and an aqueous solution of NaOH/Urea were utilized for comparison in dissolving operations and in the properties of regenerated fiber, as described in more detail below.

Single weft knit 100% white cotton shirt was used as the raw material. Lithium hydroxyl monohydride (LiOH·H$_2$O, purity=99.0%), urea (NH$_2$CONH$_2$, purity≥98.0%), ammonium sulfate [(NH$_4$)$_2$SO$_4$, purity=98%], sulfuric acid (H$_2$SO$_4$, purity=95.0-98.0%), and sodium hydroxide (NaOH, purity=98%) were used as reagents. The cotton shirt was first shredded and pretreated to reduce its molecular weight. Shredded cotton was immersed in a sulfuric acid solution and treated at an elevated temperature for hydrolysis. Two different sulfuric acid concentrations, i.e., 0.05 wt % and 0.2 wt % in water were used. The cotton/acid mixture was autoclaved with a pressure of 20 psi at 120° C. for 12 minutes. After cooling down to room temperature, the hydrolyzed cotton was collected by filtration and washed using distilled water until a pH value of the washing solution reached about 7. The hydrolyzed cotton was then dried overnight in a conventional oven at about 50° C. The degree of polymerization (DP) of the hydrolyzed cotton was finally determined by viscometry in a copper ammonia solution at 25° C.

After drying, the hydrolyzed cotton was dissolved in aqueous solution of LiOH/Urea/H$_2$O or NaOH/Urea/H$_2$O with two different ratios of the three components at 8.75: 10:81.25 and 7.5:12:80.5 by weight. Both hydrolyzed cotton and the solvents were pre-cooled to −12.5° C. and then mixed together under vigorous stirring for 40 minutes at −5° C. in an ice-liquid nitrogen bath. Spinning solutions with different dissolved cotton or cellulose concentrations of about 3.25% and about 5% by weight were prepared and corresponding viscosity values were measured. The influences of solvent composition and cotton concentration on regenerated fiber properties were analyzed.

A wet spinning apparatus generally similar to that shown in FIG. 3 was used for wet spinning. In particular, the wet spinning apparatus includes a polymer cylinder reservoir with a spinneret, a coagulation bath, and a rotating fiber collector for regenerated fiber spinning. After loading a prepared spinning solution into the cylinder reservoir, compressed N$_2$ gas was used to extrude the spinning solution into the coagulation bath. The coagulation bath contains H$_2$SO$_4$/ (NH$_4$)$_2$SO$_4$/H$_2$O at a ratio of about 7.5:7.5:85 by weight under ambient room temperature. The diameter of the spinneret orifice was 80 μm. The coagulated regenerated fiber was collected by the rotating fiber collector, and was then washed with hot and then room temperature water. The regenerated fiber was then dried at room temperature for at least 24 hours prior to characterization. Fiber diameter, morphology, thermal properties, crystallinity, and tensile properties of samples of the regenerated fiber were evaluated.

The viscosity of spinning solutions was measured at a shear rate of 1 s$^{-1}$. A cooling bath (water-ice) was applied to control the measurement temperature at approximately 4° C. Field emission scanning electron microscopy was used to observe the original and regenerated fibers. Morphologies of fiber surface, cross-section and tensile fracture surface were studied. All samples were sputter-coated with platinum of roughly 2.8 nm in thickness before characterization. Fiber diameter was determined by measuring fiber cross-section images and a total area of at least thirty fibers randomly selected from the images were measured to calculate an average fiber diameter.

The crystallinity of the original, hydrolyzed, and regenerated fibers were determined by analyzing X-ray Diffraction (XRD) patterns recorded using an X-ray Diffractometer. The Ni-filtered Cu Kα radiation (λ=0.15418 Å) was at 40 kV, 25 mA, and a scanning step was about 2° from 2θ=5° to 40°. To determine thermal decomposition of original, hydrolyzed, and regenerated fibers, a thermogravimetric analyzer was utilized. The tests were performed at about a 10° C./min heating rate from ambient temperature to 600° C. under a nitrogen environment with a flow rate of 100 mL/min. A sample of approximately 5 mg fiber was loaded for testing.

Tensile tests were performed on a universal testing machine. A distance between two clamps was set at 25 mm, and a crosshead speed was maintained at about 5 mm/min. Fiber tenacity and percent elongation were calculated from a mean of tensile load and elongation of 40 measurements. The strength was obtained from an average tensile load and average fiber diameter.

The original cotton fibers had a degree of polymerization (DP) of about 1800, which resulted in low dissolution in the solvent and extremely high viscosity. To obtain solutions with a suitable range of viscosity for fiber spinning, acid-induced hydrolysis was applied as a pre-treatment of the shredded cotton shirt. Samples were hydrolyzed with about 0.05 and about 0.2 wt % H$_2$SO$_4$ to have a DP of about 760 and about 659, respectively. The viscosity, η, of four hydrolyzed-cotton solutions are presented in the table below:

| Solvent system | Sample | | η (mPa · s) |
| --- | --- | --- | --- |
| | Hydrolyzation H$_2$SO$_4$ wt % | Hydrolyzed Cotton wt % | |
| LiOH - Urea - DI | 0.05 | 3.25 | 1669 |
| | 0.2 | 3.25 | 834 |
| | | 5 | 29810 |
| NaOH - Urea - DI | 0.2 | 3.25 | 88000 |

As shown above, the viscosity values were from about 834 to about 88000 mPa·s. With a fixed cotton content, a higher H$_2$SO$_4$% led to a lower η; and a higher cotton loading caused an increase in η when H$_2$SO$_4$% was constant. The viscosity value of the sample solution prepared in NaOH was 106 times that prepared in LiOH. Without being bound by theory, cellulose in a NaOH aqueous solution can form a gel with high viscosity values. Urea can reduce or even prevent such gel formation. When a concentration of NaOH is about 6-8 wt %, a high solution viscosity without gel formation can be obtained using urea. The content of NaOH used in was about 7 wt %.

The FESEM images in FIGS. 5A-5E show distinct morphologies between the original cotton and regenerated fibers. FIG. 5A shows the original cotton fiber with a typical rough surface and convolutions along fiber length with a broad range of fiber thickness. In contrast, the regenerated fibers had relatively smooth surface and rod-like longitudinal morphology, as shown in FIGS. 5C-F. No voids or defects were observed on the surface of the regenerated fibers. The structure of the regenerated fibers was generally uniform throughout the whole surface. The average diameters of the regenerated fibers ranged from about 27 μm to about 38 μm with small standard deviations.

Thermogravimetric Analysis (TGA) was applied to evaluate the thermal behaviors of original, hydrolyzed, and regenerated fibers. According to FIGS. 6A-6D, all samples displayed a small weight drop between 50° C. and 100° C. due to retained moisture loss, and a dramatic weight loss between 300° C. and 400° C. due to cellulose thermal decomposition. The initial decomposition temperature (Ti) of both hydrolyzed and regenerated fibers was at about 300° C. compared to about 330° C. of the original cotton. And no obvious difference in Ti between hydrolyzed and regenerated samples was observed.

Figure 7:
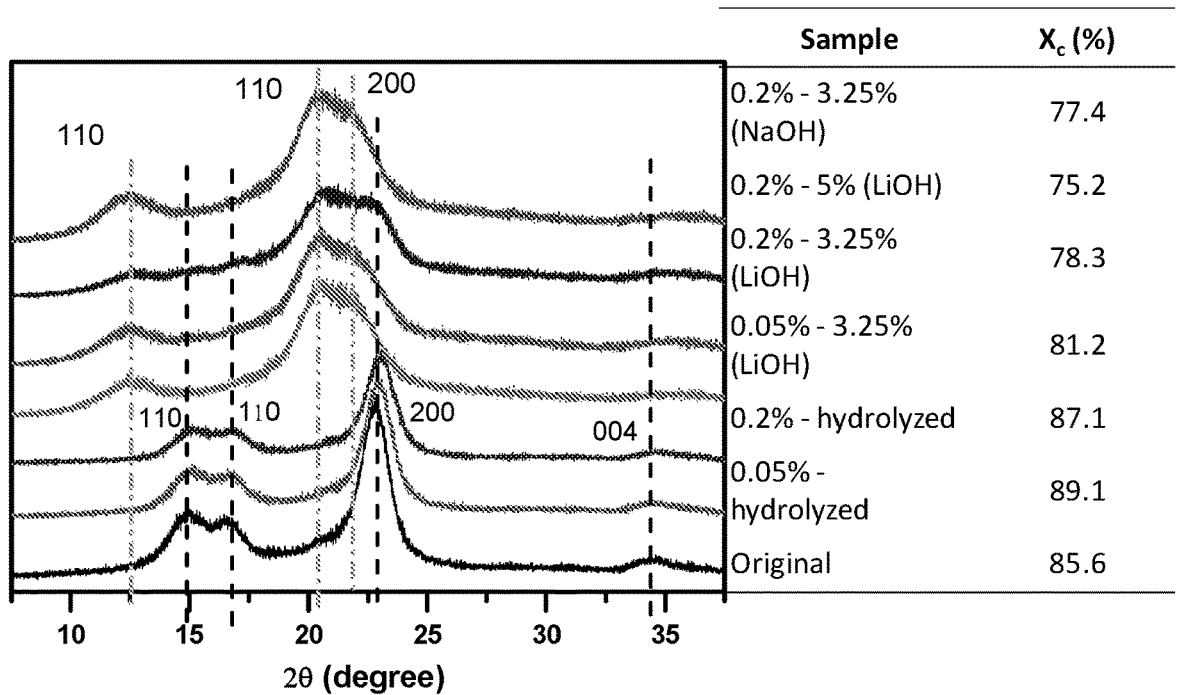
FIG. 7 is an example XRD spectra for original, hydrolyzed and regenerated cotton fiber and corresponding crystallinity calculated by XRD peak height method in accordance with embodiments of the disclosed technology.

The original, hydrolyzed, and regenerated fibers were examined by using X-ray diffraction (XRD), as illustrated in FIG. 7. The original and two hydrolyzed samples possessed very similar crystalline patterns. Three diffraction peaks at around 2θ of 15.1°, 17.2°, and 22.9°, were associated with the crystallographic planes of (110), (110), and (200), showing a structural characteristic of cellulose I, indicating that the crystalline form did not alter before and after the hydrolysis. During the fiber dissolving and regeneration process, several changes occurred in the crystalline structure of the regenerated fibers. The peaks of (110) and (110) shifted to 12.5° and 20.9°, and the (200) as shoulder peak was located at 20.1°. These changes are direct indicators of a transition from cellulose I to cellulose II in crystalline reconstruction during dissolving and fiber regeneration.

The regenerated fibers had a crystallinity of about 75-81%, which were lower than that of the original and corresponding hydrolyzed fibers. The crystallinity (Xc) increased after hydrolysis. It is believed that hydrolysis starts from amorphous regions of the fibers. The H+ ions can penetrate into non-ordered molecular chains in the amorphous regions easier than in highly ordered crystalline regions. Therefore, amorphous regions were partially removed during hydrolysis, which resulted in higher crystallinity of hydrolyzed fibers compared to the original cotton.

The tensile performance of the regenerated fibers that were processed in different solvents, H2SO4 concentrations, and cotton loadings are shown in the Table below:

| Sample | | Linear | | | |
|---|---|---|---|---|---|
| Solvent System | H$_2$SO$_4$ wt %-Cotton wt % | Density (dtex) | Tenacity (cN/dtex) | Strength (MPa) | Elongation (%) |
| LiOH-Urea-DI | 0.05-3.25 | 9.5 | 1.20 | 255 | 13.1 |
| | 0.2-3.25 | 13.7 | 1.11 | 205 | 11.4 |
| | 0.2-5 | 15.6 | 1.25 | 262 | 15.9 |
| NaOH-Urea-DI | 0.2-3.25 | 12.2 | 1.29 | 184 | 9.3 |

As shown above, for the samples prepared in LiOH-Urea-DI, the linear densities are as: 0.2%-5%>0.2%-3.25%>0.05%-3.25%, which can be correlated to the different fiber diameters presented in FIGS. 5E, 5D and 5C. Both tenacity and elongation varied with the different formulations. The overall fiber tenacity was comparable to commercial acetate and the tensile strength was comparable to cotton fibers. For the two samples prepared with the same solvent system (LiOH-Urea-DI) and cotton concentration (3.25 wt %), increased cotton hydrolysis due to the increased H$_2$SO$_4$ concentration used led to the strength reduction of the regenerated fibers from 193 MPa to 150 MPa as a result of the decreased DP and crystallinity from 81.2% to 78.3%.

Under the same solvent condition (LiOH-Urea-DI) and acid concentration (0.2 wt %), an increased cotton loading from about 3.25 wt % to about 5 wt % caused a 35% improvement in strength. Comparing the samples of 0.2%-3.25% prepared in two different solvent environments, LiOH system yielded fibers with slightly higher tensile strength. The breaking elongations of fibers were from 9.3% to 15.9%, which fell in the typical range of textile fiber elongation that provides flexibility for both comfort and processability for yarn and fabric production. It is also believed that mechanical properties of the regenerated fibers can be further improved by a drawing process after fiber coagulation.

Figure 8:
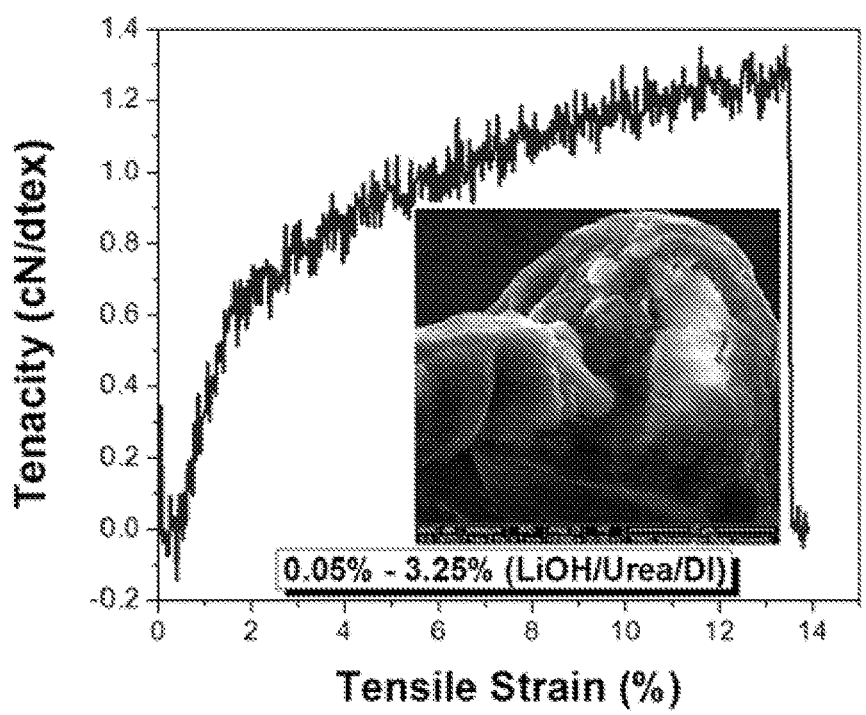
FIG. 8 is an example tenacity-tensile strain curve obtained from tensile testing of example regenerated fiber with an insert showing a tensile fracture surface of the regenerated fiber in accordance with embodiments of the disclosed technology.

A representative tenacity-strain curve recorded during tensile testing for the regenerated fibers is shown in FIG. 8. The regenerated fibers showed a range of tenacity and strain percentage values, exhibiting good mechanical properties. An example of the tensile fracture surface morphology is shown as an insert in FIG. 8. The surface morphology shows a typical granular fracture indicating the fibrillar fiber microstructure. The non-smooth fracture surface are broken ends of granules that comprise microfibrils, i.e., clusters of cellulose molecular chains, formed during fiber coagulation.

As the experiments showed that by using the alkali/urea aqueous solvents, post-consumer waste can be chemically recycled to produce regenerated fibers with good luster, intrinsic colors, and sufficient tensile strength for a broad range of applications for consumer products. The degree of hydrolysis, dissolving temperature, mechanical agitation during dissolving, solvent composition, and coagulation bath composition can all be adjusted to achieve suitable qualities in the regenerated fibers.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for recycling a post-consumer cellulose waste containing cellulose, the method comprising:

hydrolyzing the post-consumer cellulose waste containing the cellulose such that the cellulose in the hydrolyzed cellulose waste has a degree of polymerization of about 240 to about 860, the post-consumer cellulose waste being discarded after use by consumers;

dissolving the cellulose in the hydrolyzed post-consumer cellulose waste having the degree of polymerization of about 240 to about 860 in an aqueous solution containing (i) lithium hydroxide (LiOH) and (ii) urea ($(NH_2)_2CO$);

during dissolving the cellulose, maintaining a dissolution temperature setpoint of the aqueous solution between −15° C. to les than 0° C. such that a cellulose solution containing the dissolved cellulose from the post-consumer cellulose waste having a cellulose concentration of about 2% to about 10% by weight is produced; and extruding the cellulose solution containing the dissolved cellulose into a coagulation bath containing a coagulant configured to coalesce the dissolved cellulose in the extruded solution, thereby reforming the dissolved cellulose from the cellulose waste into a regenerated fiber or film.

2. The method of claim 1 wherein the coagulant in the coagulation bath contains one or more of sulfuric acid ($H_2SO_4$), ethanol, butanol, or acetone.

3. The method of claim 1 wherein:
hydrolyzing the cellulose waste includes contacting the cellulose waste with a solution of sulfuric acid having a concentration or of an enzyme; and
the method further includes adjusting one or more of a hydrolyzing time, a hydrolyzing temperature, or the concentration of the sulfuric acid or the enzyme in the solution such that the hydrolyzed cellulose waste has the degree of polymerization of about 240 to about 860.

4. The method of claim 1 wherein:
the cellulose waste contains multiple original dyes; and
reforming the dissolved cellulose from the cellulose waste into the regenerated fiber includes reforming the dissolved cellulose from the cellulose waste into the regenerated fiber without removing the multiple original dyes from the cellulose waste, the regenerated fiber having an intrinsic color that is different than any color of the individual original dyes.

5. The method of claim 1 wherein:
the dissolved cellulose contains first dissolved cellulose with a first dye and second dissolved cellulose with a second dye different than the first dye; and
reforming the dissolved cellulose from the cellulose waste into the regenerated fiber includes reforming the first and second dissolved cellulose from the cellulose waste into the regenerated fiber without removing the first dye or the second dye from the cellulose waste, the regenerated fiber having an intrinsic color that is different than colors of both the first and second dyes.

6. A method for recycling a post-consumer cellulose waste containing cellulose, the method comprising:
hydrolyzing the post-consumer cellulose waste such that the cellulose in the hydrolyzed post-consumer cellulose waste has a degree of polymerization of about 240 to about 860;

dissolving the cellulose in the hydrolyzed post-consumer cellulose waste having the degree of polymerization of about 240 to about 860 in an aqueous solution containing (i) lithium hydroxide (LiOH) and (ii) urea ($(NH_2)_2CO$);

during dissolving the cellulose, maintaining a dissolution temperature setpoint of the aqueous solution between −5° C. to less than 0° C. such that a cellulose solution containing the dissolved cellulose from the post-consumer cellulose waste having a cellulose concentration of about 2% to about 10% by weight is produced; and extruding the cellulose solution containing the dissolved cellulose into a coagulation bath containing a coagulant configured to coalesce the dissolved cellulose in the extruded solution, thereby reforming the dissolved cellulose from the cellulose waste into a regenerated fiber or film.

7. The method of claim 6 wherein:
hydrolyzing the cellulose waste includes contacting the cellulose waste with a solution of sulfuric acid having a concentration or of an enzyme; and
the method further includes adjusting one or more of a hydrolyzing time, a hydrolyzing temperature, or the concentration of the sulfuric acid or the enzyme in the solution such that the hydrolyzed cellulose waste has the degree of polymerization of about 240 to about 860.

8. The method of claim 6 wherein:
the cellulose waste contains multiple original dyes; and
reforming the dissolved cellulose from the cellulose waste into the regenerated fiber includes reforming the dissolved cellulose from the cellulose waste into the regenerated fiber without removing the multiple original dyes from the cellulose waste, the regenerated fiber having an intrinsic color that is different than any color of the individual original dyes.

9. The method of claim 6 wherein:
the dissolved cellulose contains first dissolved cellulose with a first dye and second dissolved cellulose with a second dye different than the first dye; and
reforming the dissolved cellulose from the cellulose waste into the regenerated fiber includes reforming the first and second dissolved cellulose from the cellulose waste into the regenerated fiber without removing the first dye or the second dye from the cellulose waste, the regenerated fiber having an intrinsic color that is different than colors of both the first and second dyes.

\* \* \* \* \*